Oct. 13, 1959          T. E. WEST          2,908,433

DETACHABLE HAT AND CLOTHES RACK FOR MOTOR VEHICLES

Filed Sept. 23, 1958

INVENTOR
TAYLOR E. WEST
BY
Kimmel & Crowell
ATTORNEYS

United States Patent Office 2,908,433
Patented Oct. 13, 1959

2,908,433

DETACHABLE HAT AND CLOTHES RACK FOR MOTOR VEHICLES

Taylor E. West, Mohawk, Oreg.

Application September 23, 1958, Serial No. 762,778

1 Claim. (Cl. 224—42.1)

The present invention relates to detachable hat and clothes rack for motor vehicles.

The primary object of the invention is to provide a detachable hat and clothes rack engaged against the ceiling of the motor vehicle, and supported at opposite ends thereof on the window mouldings on opposite sides of the motor vehicle.

Another object of the invention is to provide a hat and clothes rack of the class described above formed of steel rods welded together to provide a support for the hat and clothes.

Another object of the invention is to provide a hat and clothes rack for motor vehicles of the class described above which is inexpensive to manufacture, simple to attach and detach and which furnishes considerable additional storage without interfering with the normal use of the motor vehicle.

Other objects and advantages will become apparent in the following specification when considered in light of the attached drawings, in which.

Figure 1:
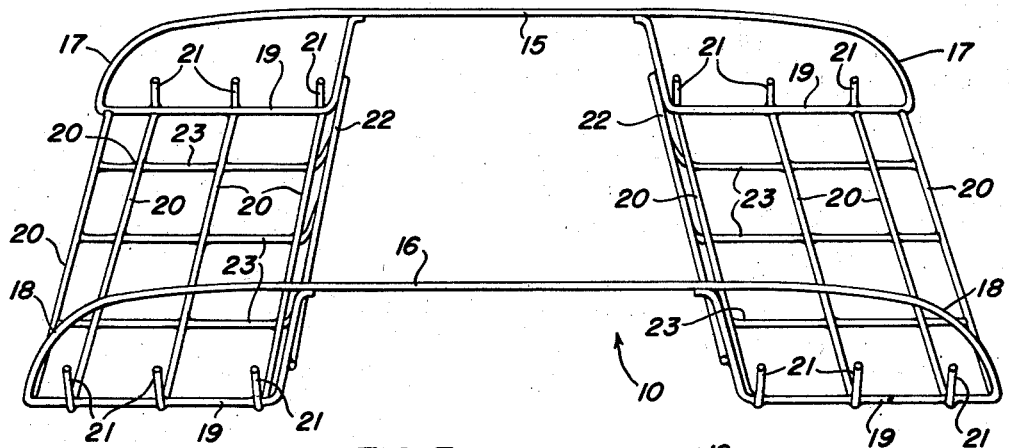
Figure 1 is a perspective view of the invention.
Figure 3:
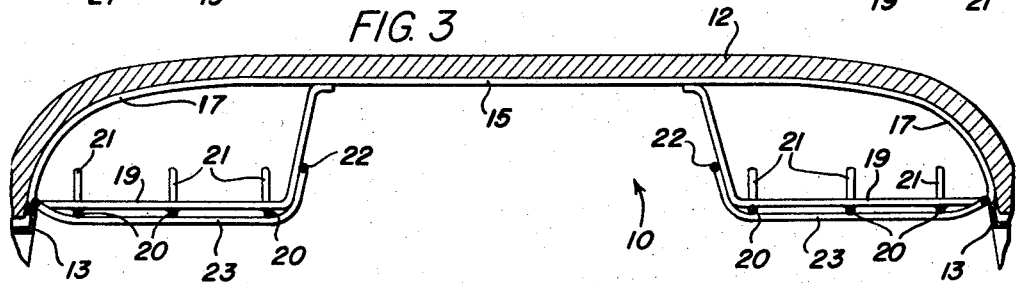
Figure 3 is a vertical transverse section taken along the line 3—3 of Figure 2, looking in the direction of the arrows.
Figure 2:
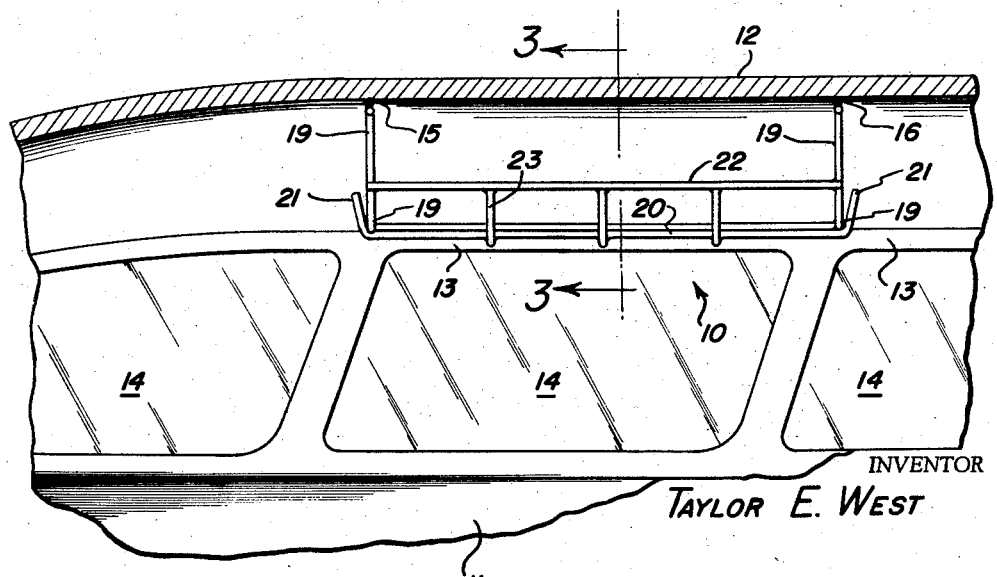
Figure 2 is a longitudinal vertical sectional view of the invention shown attached to a motor vehicle, partially broken away and in sections for convenience of illustration.

Referring now to the drawings in detail wherein like reference characters indicate like parts throughout the several figures, the reference numeral 10 indicates generally a hat and clothes rack constructed in accordance with the invention.

The rack 10 is used with motor vehicles and particularly with motor vehicles of the station wagon type generally indicated at 11, having a roof 12, window mouldings 13, and windows 14. The rack 10 includes a pair of transversely extending support rods 15, 16 which are arranged in parallel relation and have their opposite ends downwardly bowed at 17, 18, respectively. The transverse support rods 15, 16 have the downwardly bowed portions 17, 18 releasably engaged on the window mouldings 13 above the windows 14. The transversely extending rods 15, 16 are tensioned slightly in a direction such that the restorative forces tend to draw the opposite ends 17, 18 toward each other and to bias the center portions upwardly, so that as the rods 15, 16 are positioned against the roof 12 of the motor vehicle, they will fit tightly thereagainst as well as tightly against the sides of the motor vehicle to completely prevent rattling and dislodgement.

The support rods 15, 16 are each provided with a depending L-shaped bracket 19 at each end thereof with the brackets 19 on the rod 15 being arranged in aligned relation with the brackets 19 on the rod 16.

A plurality of longitudinally extending generally horizontal rods 20 extend between and are connected to the aligned brackets 19 and are provided with upwardly offset opposed end portions 21 to provide forward and rear end guards for the material supported on the rods 20. The aligned brackets 19 are additionally connected by longitudinally extending rods 22 adjacent the inner side of each of the brackets 19 and spaced above the rods 20.

The rods 20 with their upturned end portions 21 and the rods 22 form a basket-type support in which clothing, hats and other gear may be stored without materially decreasing the space in the motor vehicle available for normal uses. Obviously, the gear stored on the rods 20 can be tied thereto, if desired.

A plurality of transverse rods 23 extend perpendicularly to the rods 20 and are welded thereto assisting in forming the basket-type support.

Having thus described the preferred embodiment of the invention, it should be understood that numerous structural modifications and adaptations may be resorted to without departing from the scope of the appended claim.

What is claimed is:

A hat and clothes rack for motor vehicles comprising a pair of tensionable transverse one piece arcuate support rods arranged in spaced parallel relation and having downwardly curved opposite end portions integrally formed thereon for engagement on the window moulding of a motor vehicle, an L-shaped bracket rigidly secured in depending relation to each end of each of said rods, a plurality of longitudinally extending bars having their opposite end portions rigidly secured to said brackets, and upwardly sloping opposite ends integrally formed on said bars extending beyond said brackets, said brackets and said bars forming a pair of oppositely disposed racks rigidly carried by said rods to support hats and clothes in the motor vehicle.

References Cited in the file of this patent

UNITED STATES PATENTS

| 1,711,784 | Heiber | May 7, 1929 |
| 2,253,423 | Fellers | Aug. 19, 1941 |
| 2,672,988 | Johnson | Mar. 23, 1954 |

FOREIGN PATENTS

| 819,359 | Germany | Oct. 31, 1951 |